Patented June 19, 1934

1,963,133

UNITED STATES PATENT OFFICE 1,963,133

AZO DYE AND PROCESS OF PREPARING SAME

Henry Jordan and Miles Augustinus Dahlen, Wilmington, Del., assignors to E. I. du Pont de Nemours & Company, Wilmington, Del., a corporation of Delaware No Drawing. Application September 19, 1931, Serial No. 563,898

10 Claims. (Cl. 260—97)

This invention relates to a novel class of monoazo dyes and their preparation. These dyes are especially adapted to dyeing acetyl cellulose. We have found that valuable monoazo dyes useful in dyeing acetyl cellulose can be prepared by coupling a diazo compound of the benzene or naphthalene series which does not contain a free sulfo- or carboxy-group to an amine which possesses the following probable formula:

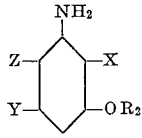

$R_2$ being an alkyl group, X, Y, and Z being hydrogen, alkyl, alkoxy or halogen.

The new dyes will most probably have the following general formula:

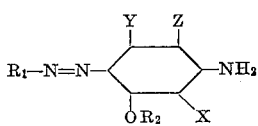

$R_1$ meaning a radical of the benzene or naphthalene series not containing a free sulpho- or carboxy-group, $R_2$ meaning an alkyl group, and X, Y and Z meaning hydrogen, alkyl, alkoxy or halogen.

In order to fully illustrate the new invention the following examples may be given:

Example I 93 parts of aniline are diazotized in the usual way. To the diazo solution there is added a solution of 123 parts of m-anisidine in 2000 parts of water and 120 parts of a 31% hydrochloric acid solution. The mineral acidity of the coupling is neutralized with sodium acetate, maintaining a slight mineral acid reaction on Congo red paper. After stirring over night at 10–15° C. the coupling will be finished. The dye is salted out from an acid solution and dried. In its dry, ground form it represents a dark violet black powder. The new dye has most probably the following formula:

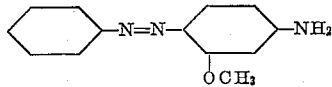

On reduction with stannous chloride it will yield aniline and 2:5-diamino-anisol.

The new dye is soluble in acidified water (acids used may be a mineral acid or oxalic acid) with a bright yellowish orange coloration. The solution in concentrated sulphuric acid is of a bright yellowish orange color. The product will dye acetyl cellulose from an acid bath in bright greenish yellow shades of a very good tinctorial power. On diazotizing on the fiber and developing with beta-naphthol a bright bluish scarlet is obtained; with resorcin a full orange-brown; and with beta-oxynaphthoic acid a deep bluish-Bordeaux. The dyeings are fast to washing and to light and will give a pure white with a proper reducing discharge medium.

Example II

If, in Example I, the 93 parts of aniline are substituted by 107 parts of p-toluidine, leaving all other conditions the same, a dye is obtained which in its dry, ground form is a reddish brown powder soluble in acidified water with an orange coloration; in concentrated sulphuric acid with a reddish orange color. It will dye acetyl cellulose in bright yellow shades; the beta-naphthol developed shade is bluish-red; beta-oxy-naphthoic a reddish-violet. The properties are similar to those given in Example I. The dye most probably has the following formula:

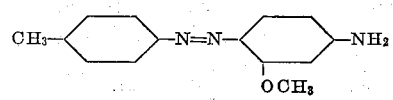

yielding on reduction with stannous chloride p-toluidine and 2:5-diamino-anisol.

Example III

Substituting in Example I the 93 parts of aniline by 143 parts of alpha-naphthylamine, leaving all other conditions the same, a dye is obtained which in its dry, ground form is a dark brown powder, soluble in acidified water with an orange coloration; in concentrated sulphuric acid with a deep bluish violet coloration. It will dye acetyl cellulose in orange shades, which when diazotized and developed with beta-naphthol will give a Bordeaux; with resorcin a brown; and with beta-oxy-naphthoic acid a reddish-violet.

The dye most probably has the following formula:

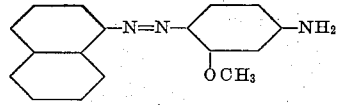

It yields, on reduction with stannous chloride, alpha-naphthylamine and 2:5-diamino-anisol.

The properties of this dye are similar to those of Example I.

Example IV

Substituting in Example I, 120 parts of m-anisidine by 153 parts of amino-hydroquinone-dimethyl-ether, leaving all other conditions the same, the dye obtained represents in its dry, ground form an orange-red powder, soluble in acidified water with an orange coloration; in concentrated sulphuric acid with a Bordeaux coloration. It will dye acetyl cellulose in bright yellowish orange shades. The shades with various developers are as follows:

Beta-naphthol_____bright bluish-violet
Resorcin_____Bordeaux
Beta-oxy-naphthoic acid____bright blue on light dyeings, bluish-black on heavy dyeings.

The properties of the dyeings are similar to those of Example I. This dye most probably has the following formula:

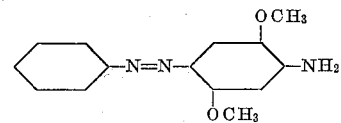

On reduction with stannous chloride it will yield aniline and 2:5-diamino-hydroquinone-dimethyl-ether.

Other combinations are given in tabular form in the following table.

| Diazo compound | Coupling compound | Direct shade | Beta-naphthol shade | Resorcin shade | Beta-oxy naphthoic shade |
|---|---|---|---|---|---|
| p-toluidine | Amino-hydroquinone-dimethyl-ether. | Orange | Bright reddish-violet. | Maroon | Bright blue to black. |
| p-anisidine | Amino-hydroquinone-dimethyl-ether. | Yellowish-brown | Bright bluish-violet. | Dull reddish-violet. | Light greenish blue to black. |
| p-phenetidine | Amino-hydroquinone-dimethyl-ether. | Yellowish-brown | Bright bluish-violet. | Dull reddish-violet. | Light greenish blue to black. Trace duller than p-anisidine dye. |
| Alpha-naphthylamine | Amino-hydroquinone-dimethyl-ether. | Yellowish-brown | Bluish-violet | Dull reddish-violet. | Greenish-blue. |
| Beta-naphthylamine | Amino-hydroquinone-dimethyl-ether. | Yellowish-orange | Bluish-violet | Dull reddish-violet. | Greenish-blue. |
| p-nitroaniline | Amino-hydroquinone-dimethyl-ether. | Red | Bluish-violet | Reddish-violet | Blue. |
| m-nitroaniline | Amino-hydroquinone-dimethyl-ether. | Reddish-yellow | Violet | Bordeaux | Blue. |
| m-xylidine | Amino-hydroquinone-dimethyl-ether. | Bright orange | Violet | Bluish-Bordeaux | Blue. |
| p-cumidine | Amino-hydroquinone-dimethyl-ether. | Orange | Violet | Reddish-violet | Greenish-blue. |
| 4-nitro-2-anisidine | Amino-hydroquinone-dimethyl-ether. | Orange | Violet | Reddish-violet | Blue. |
| p-chloroaniline | Amino-hydroquinone-dimethyl-ether. | Orange | Violet | Bordeaux | Bright blue to black. |
| Acetyl-p-phenylenediamine | Amino-hydroquinone-dimethyl-ether. | Orange-brown | Bluish-violet | Reddish-violet | Very greenish blue. |
| Acetyl-m-toluylenediamine | Amino-hydroquinone-dimethyl-ether. | Light orange | Dull reddish-violet. | Maroon | Gray. |
| o-anisidine | Amino-hydroquinone-dimethyl-ether. | Orange | Dull reddish-violet. | Dull Bordeaux | Gray. |
| 5-nitro-2-anisidine | Amino-hydroquinone-dimethyl-ether. | Red | Bluish-violet | Reddish-violet | Reddish gray. |
| Cresidine | Amino-hydroquinone-dimethyl-ether. | Reddish-orange | Dull reddish-violet. | Bordeaux | Reddish gray. |
| Amino-hydroquinone-dimethyl-ether. | Amino-hydroquinone-dimethyl-ether. | Yellowish-brown | Bluish-violet | Dull violet | Greenish blue. |
| 3-nitro-4-anisidine | Amino-hydroquinone-dimethyl-ether. | Dull red | Dull reddish-violet. | Dull Bordeaux | Reddish-gray. |
| 1:7-amino-naphthol | Amino-hydroquinone-dimethyl-ether. | Yellowish-brown | Bluish-violet | Reddish-violet | Very greenish-gray. |
| Alpha-naphthylamine | Amino-hydroquinone-diethyl-ether. | Reddish-brown | Bluish-violet | Reddish-violet | Very greenish-blue. |
| p-toluidine | Amino-hydroquinone-diethyl-ether. | Orange | Violet | Maroon | Blue. |
| p-nitroaniline | 2-chlor-3-amino-anisol | Orange | Bluish-red | Orange-brown | Bordeaux. |
| p-anisidine | 2-chlor-3-amino-anisol | Orange | Bluish-red | Orange-brown | Violet. |
| Aniline | CH₃–C₆H₃(OCH₃)–NH₂ | Yellow | Bright Bordeaux | Orange-brown | Violet. |
| p-anisidine | CH₃–C₆H₃(OCH₃)–NH₂ | Orange-brown | Bluish-Bordeaux | Maroon | Reddish-blue. |
| Alpha-naphthylamine | CH₃–C₆H₃(OCH₃)–NH₂ | Orange-brown | Dull Bordeaux | Reddish-brown | Navy blue. |

In addition to the diazo compounds mentioned in the preceding examples and in the foregoing table, other amino compounds of the benzene and naphthalene series, which do not contain a free sulfo- or carboxy- group, may be used. For example, the various halogenated anilines, toluidines, and anisidines, the nitro-amino- and halogenated nitro-amino-derivatives of the benzene and naphthalene series, and the amino-benzamides, amino-sulphonamides, and amino-sulphonanilides may be used when in the diazotized condition.

Other coupling compounds which correspond to the general formula:

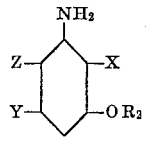

in which $R_2$ is an alkyl group; X, Y, and Z may be hydrogen, alkyl, alkoxy or halogen may be employed, thus m-phenetidine, 1-amino-3-methoxy-6-methylbenzene and various homologues of these and the other illustrative compounds may be employed.

In general, these dyes show a very good solubility in an acid solution and have exceptional affinity for acetyl cellulose in an acid bath. Moreover, having a free amino group they may be diazotized and developed on the fiber, producing various shades of good fastness to washing and to light and giving a white discharge with reducing discharge media.

Since many embodiments of this invention, differing widely in one or more respects, may be made without departing from the spirit of our invention, it is to be understood that we do not limit ourselves to the foregoing examples or description except as indicated in the following claims:

We claim:

1. A process for producing azo dyes which comprises coupling a diazotized amine of the benzene or naphthalene series which may have substituted thereon members selected from the groups consisting of alkyl, alkoxy, nitro, and halogen, with an amine of the following general formula:

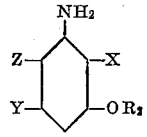

in which $R_2$ is an alkyl group, and X, Y and Z are hydrogen, halogen, alkyl or alkoxy groups.

2. An azo dye having the following general formula:

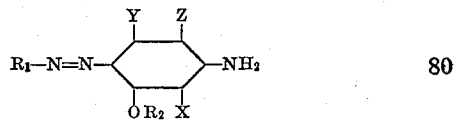

in which $R_1$ is an aromatic nucleus of the benzene or naphthalene series which may have substituted thereon alkyl, alkoxy, nitro and halogen groups, $R_2$ is an alkyl group and X, Y and Z are hydrogen, halogen, alkyl, or alkoxy groups.

3. A process for producing azo dyes which comprises coupling a diazotized amine of the benzene series which may have substituted thereon members selected from the group consisting of alkyl, alkoxy, nitro and halogen, with amino-hydroquinone-dimethyl-ether.

4. An azo dye having the following general formula:

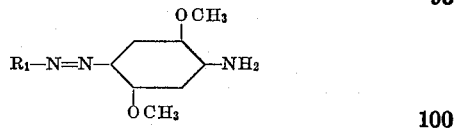

in which $R_1$ is an aromatic nucleus of the benzene series which may have substituted thereon members selected from the group consisting of alkyl, alkoxy, nitro and halogen.

5. A process of preparing a dyestuff suitable for acetyl cellulose which comprises coupling a diazotized solution of aniline with m-anisidine.

6. A dyestuff suitable for dyeing acetyl cellulose which has the following formula:

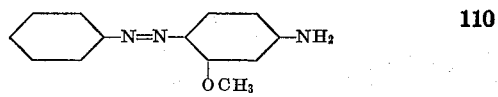

7. A process of preparing a dyestuff suitable for acetyl cellulose which comprises coupling a diazotized solution of p-anisidine with amino-hydroquinone-dimethyl-ether.

8. A dyestuff suitable for dyeing acetyl cellulose which has the following formula:

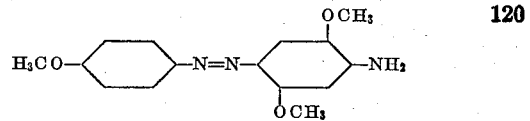

9. A process for producing azo dyes which comprises coupling diazotized aniline with amino-hydroquinone-dimethyl-ether.

10. An azo dye having the following formula:

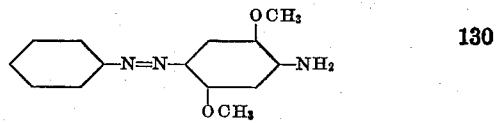

HENRY JORDAN.
MILES AUGUSTINUS DAHLEN.